United States Patent [19]

Kern

[11] Patent Number: 4,464,152
[45] Date of Patent: Aug. 7, 1984

[54] METAL POWER TRANSMISSION BELT

[75] Inventor: John M. Kern, Ithaca, N.Y.

[73] Assignee: Borg-Warner Corporation, Chicago, Ill.

[21] Appl. No.: 344,679

[22] Filed: Feb. 1, 1982

[51] Int. Cl.³ ............................ F16G 1/26; F16G 51/80
[52] U.S. Cl. ...................................... 474/245; 474/201; 474/271
[58] Field of Search .............. 474/242, 201, 244, 245, 474/271, 272

[56] References Cited

U.S. PATENT DOCUMENTS

| 779,253 | 1/1905 | Bayliss | 474/201 |
| 1,898,035 | 2/1933 | Diamond | 474/242 |
| 2,663,194 | 12/1953 | Ogard | 474/242 |
| 3,138,034 | 6/1964 | Dittrich et al. | 474/201 |
| 4,313,730 | 2/1982 | Cole, Jr. et al. | 474/201 |

FOREIGN PATENT DOCUMENTS

2414891 10/1975 Fed. Rep. of Germany ...... 474/201

Primary Examiner—Lawrence J. Staab
Assistant Examiner—Michael D. Bednarek
Attorney, Agent, or Firm—Aubrey L. Burgess

[57] ABSTRACT

A chain-belt adapted for use in a pulley drive system and comprising a plurality of connected ranks or sets of interleaved links having generally trapezoidal load blocks between adjacent pivot means which join the adjacent ranks or sets of links together to permit articulation of the chain belt. The load blocks are of generally laminated construction of a plurality of plates and resilient means are located between adjacent plates in at least some of the load blocks. Preferably an elastomeric material such as rubber is chosen as the resilient means and each load block incorporates the resilient means.

The structure is effective to reduce noise generated upon engagement and disengagement of the chain-belt with the pulley flanges when compared to a chain-belt of connected ranks of links and with laminated load blocks therein but without the resilient means.

7 Claims, 5 Drawing Figures

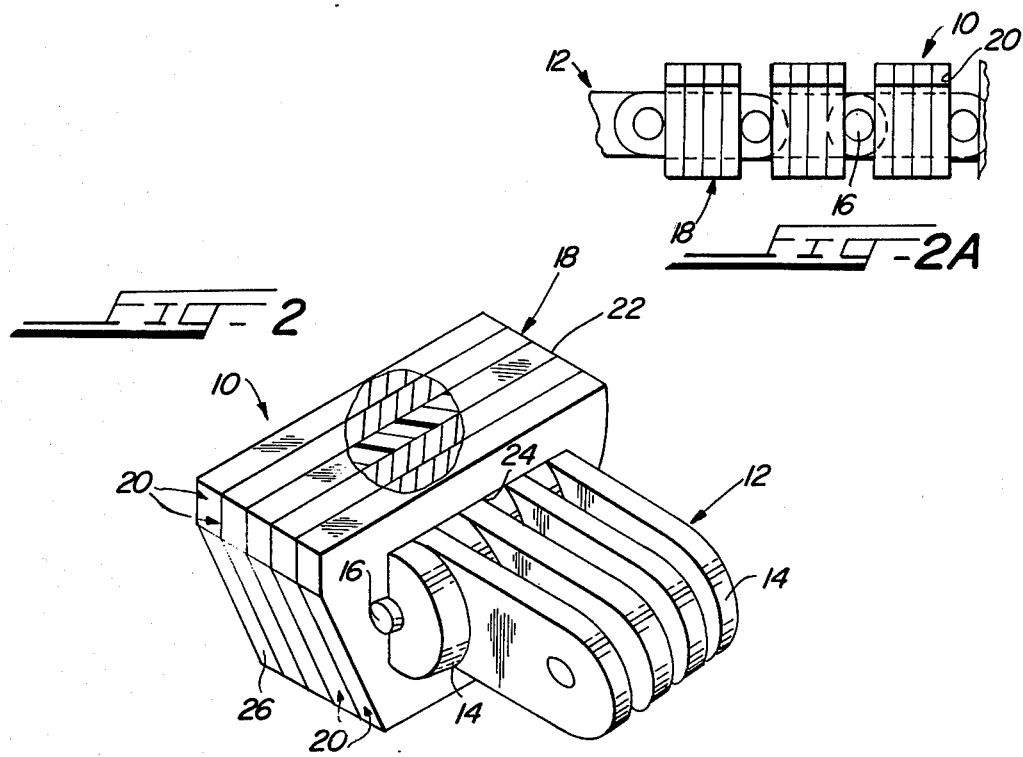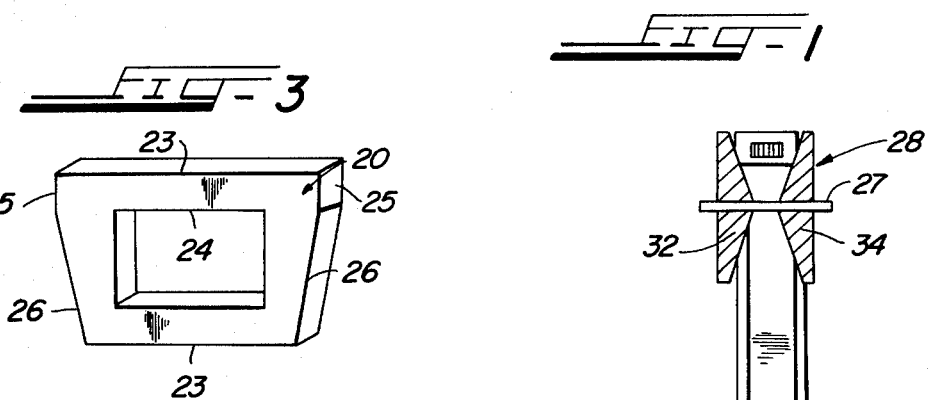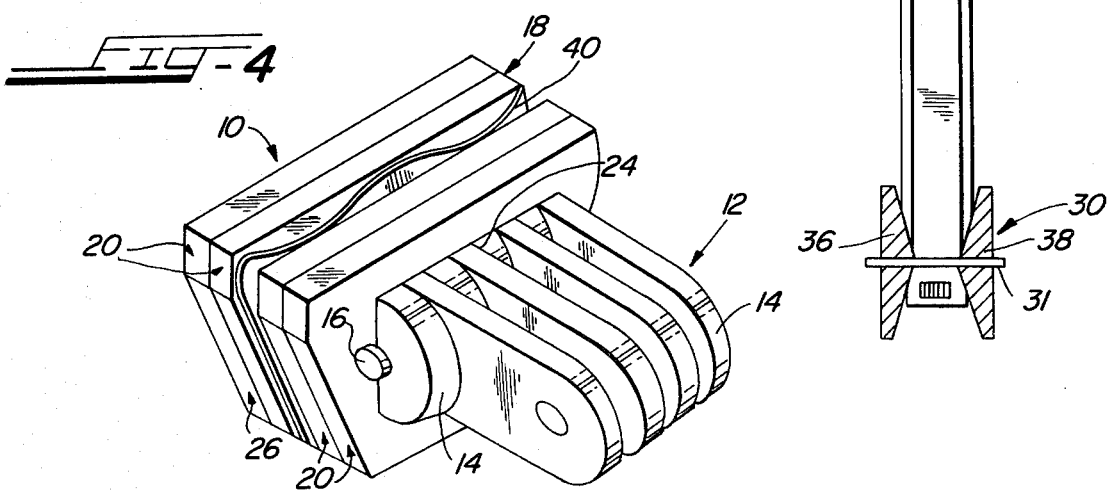

METAL POWER TRANSMISSION BELT

BACKGROUND OF THE INVENTION

Various types of belts for use in pulley drives or transmissions are well-known in the art. The usual belt comprises a tension member bonded to an elastomeric material and covered with a cloth. The usual tension members are steel wires or fiberglass strand; the usual elastomeric material is rubber, either natural or synthetic; and the usual cloth covering is a nylon cloth. These belts are not generally suitable for use in automotive drives because they are not capable of handling the torque and speed requirements of automotive use and the heat generated is detrimental to their construction. Also, they are not suitable for use in a lubricant-filled environment as found in automobile transmissions. Belts particularly suitable for automotive drives have been suggested; one form comprises a plurality of superimposed metal bands with metal load blocks longitudinally movable along the bands. These belts are expensive to manufacture because of the manufacturing tolerances required to match and assemble the bands.

Another belt for pulley transmissions comprises a plurality of interconnected links with angled wing members connected to or formed integrally with the outside links so as to engage the pulley flanges; wing members can also be made to clip onto the roller type chain.

It has also been suggested to construct a chain-belt of a plurality of interconnected ranks or sets of interleaved links, the adjacent sets of which are joined by pivot means. The pivot means can be a round pin or a pin and rocker joint as known in the art. Load blocks are arranged on the links between adjacent connecting pivot means. A chain-belt as thus described can be produced at considerably less cost than the belt of bands and blocks; however, the chain-belt so constructed generates noise of certain frequencies and levels when engaging and/or disengaging the flanges of the pulleys. The noise so generated may be objectionable, especially when the chain-belt is used for automotive purposes.

SUMMARY OF THE INVENTION

An endless chain-belt, adapted to be used in a pulley drive, is constructed of a plurality of ranks or sets of interleaved links, the adjacent ranks or sets being joined by pivot means to permit articulation of the chain-belt. The pivot means may be round pins or pin and rocker joints as known in the art. Load blocks are located between the adjacent pivot means. The load blocks are constructed of a laminated set of plate-like members of generally polygonal-shape, each block and plate having a center opening permitting its assembly onto the links. The load blocks have tapered sides for drivingly engaging the flanges of the pulleys in a pulley drive. The pulley drive may be of a variable nature wherein speed changes are accomplished by changing the spacing of the pulley flanges.

In accordance with this invention, a damping means such as a load block shaped member of a resilient, elastomeric material or other suitable damping material is located between a pair of adjacent load block plates in at least some of the load blocks; at times each load block contains one damping means or material member. The damping means can be a spring or spring-like member which functions to resiliently separate the plates of a load block. It has been found that such damping means reduces the impact noise of the belt upon entering and exiting the pulleys or at least modifies the distribution of the noise in the frequency spectrum, such that the noise is much less, if at all, objectionable for automotive use.

The resilient, elastomeric material, damping means, when used according to this invention, can be rubber, either natural or synthetic, which can withstand the environment in which the drive operates as when the pulley drive is operated in an oil. When it is possible to reduce noise by merely inserting a sheet-like elastomeric material between the adjacent plates, it is preferable to adhere the material onto one of the plates. This can be accomplished by cementing the elastomeric material to one or both of the next adjacent plates or by spraying the elastomeric material onto one or both of the next adjacent plates. A spring or spring-like damping member when used according to this invention, is made of metal or a plastic which will function in the environment in which the drive operates. The rubbers, metals and plastics which can be used are known to those skilled in the automotive art.

BRIEF DESCRIPTION OF THE DRAWING

FIG. 1 is a schematic view of a typical pulley drive system in which the chain-belt of the invention is useful;

FIG. 2 is a partial perspective view of one set of components for a chain-belt constructed according to this invention;

FIG. 2a is a partial side view of a chain-belt constructed according to this invention;

FIG. 3 is a perspective view of an element shown in FIG. 1; and

FIG. 4 is a perspective illustration similar to that of FIG. 2, but using a spring or spring-like member between a pair of the block plates.

DESCRIPTION OF THE PREFERRED EMBODIMENTS

A chain-belt constructed in accordance with the invention is especially useful in connection with a pulley drive system, such as tht generally illustrated in FIG. 1. As there shown, an input shaft 27 is provided to receive input drive from any suitable source (not shown) an input pulley 28 is journalled on the input shaft 27, and an output pulley 30 is journalled on an output shaft 31. Input pulley 28 is comprised of two individual sheaves or flanges 32, 34 and output pulley 30 similarly has a pair of flanges or sheaves 36, 38. A chain-belt 10 is shown in a position to pass drive from input pulley 28 to output pulley 30 when shaft 27 is driven. The individual flanges of each pulley can be fixed with respect to each other, or one flange of each pulley can be axially displaceable with respect to the other to effect a change in the angular velocity of output shaft 31 for a given input rotational speed of shaft 27. Such arrangements are now well-known and understood in the art, and it is with such pulley drives that the chain-belt of the present invention finds particular utility.

FIGS. 2 and 2a illustrate salient components of a chain-belt constructed in accordance with one aspect of the invention. The chain-belt is constructed of a plurality of connected ranks or sets 12 of interleaved links 14, two ranks of which are illustrated in FIG. 2. One rank is within a load block 18, and this set is connected to the second rank by pivot means 16, shown as round pins. The round pins 16 can be replaced by a pin and rocker joint as is known in the art. One load block 18 is positioned between each pair of adjacent pivot means 16. The load block comprises a plurality of generally polygon-shaped plates 20 of sufficient number to extend from one pivot means 16 to the adjacent pivot means.

In accordance with the invention, a damping means 22 of the same general configuration as the plates 20 is located between two plates of one set of adjacent plates 20. The damping, resilient means 22 can be an elastomer, such as rubber or the like. While it is possible to construct a chain-belt with some load blocks without the addition of the damping means, it is presently believed preferable to construct all load blocks with a damping means, either of the type illustrated in FIG. 2 or another damping means. The damping means of the FIG. 2 embodiment can be in the form of a sheet; the sheet can be bonded to one or both of the adjacent plates, or the material can be sprayed onto one or both of the plates.

FIG. 3 illustrates a typical load block plate 20 which has a central opening 24 and tapered side edges 26. The opening 24 permits the assembly of the plates onto the ranks of links. The exterior of plate 20 is generally a polygon of six sides, but also appears generally trapezoidal in outline. That is, the plate has two spaced-apart, parallel surfaces 23, and two surfaces 26 which make an obtuse angle with the lower surface 23. In this technology, the angle is generally in the range of 100° to 105°, or 10° to 15° from the perpendicular. The shorter segments 25 intersect the upper surface 23 at right angles. The taper or angle of surfaces 26 is required for a flush fit with the inside portions of the flanges in the pulleys 28, 30 of the arrangement depicted in FIG. 1.

FIG. 4 illustrates an alternative construction in which a spring or spring-like member 40, generally of metal, replaces the member 22 to function as the damping means in the load block 18; the other reference characters refer to like parts of FIGS. 2 and 4. Spring or spring member 40 function in the same manner, as does resilient means 22. The spring 40 can be made of a plastic if desired.

I claim:

1. A metal chain-belt especially adapted for use in a pulley drive system which comprises:
    a plurality of links arrayed in a plurality of interleaved sets;
    pivot means joining the sets of links to form an endless chain-belt;
    a plurality of spaced, generally trapezoidal-shaped load blocks with edges for contacting said pulleys, one block being positioned between each pair of adjacent pivot means and each load block comprising a plurality of like flat plates, each plate having a central opening permitting its assembly on a set of links; and
    a sound damping means between a pair of next adjacent plates in at least some of said load blocks, said damping means also being generally trapezoidal in shape and generally the same transverse size as said plates.

2. A chain-belt as recited in claim 1 in which said damping means is between a pair of adjacent plates of each load block.

3. A chain-belt as recited in claim 2 in which said damping means is an elastomer.

4. A chain-belt as recited in claim 3 in which said damping means is bonded to at least one of said adjacent plates.

5. A chain-belt as recited in claim 3 in which said damping means is in sheet form.

6. A chain-belt as recited in claim 3 in which said elastomer is a coating on one of said adjacent plates.

7. A chain-belt as recited in claim 1 in which said damping means is a spring-like member.

* * * * *